United States Patent [19]

Fiedelman

[11] 3,891,397
[45] June 24, 1975

[54] CRYSTALLIZATION OF SODIUM CHLORIDE OF REDUCED CALCIUM SULFATE CONTENT IN PRESENCE OF ABOUT 5 TO ABOUT 500 PPM

[75] Inventor: Howard W. Fiedelman, Woodstock, Ill.

[73] Assignee: Morton-Norwich Products, Inc., Chicago, Ill.

[22] Filed: June 19, 1974

[21] Appl. No.: 480,615

[62] Continuation-in-part of Ser. No. 439,289, Feb. 4, 1974, abandoned.

[52] U.S. Cl. ............... 23/300; 23/302; 23/297; 23/298; 23/299; 299/5; 423/208
[51] Int. Cl.² .................. C01C 3/06; C01D 3/16
[58] Field of Search .. 23/300, 302, 272 AM, 293 R, 23/296, 297, 298, 299, 300 R; 299/5; 423/205, 208

[56] References Cited
UNITED STATES PATENTS
| | | | |
|---|---|---|---|
| 2,108,783 | 2/1938 | Smith | 23/300 |
| 3,148,023 | 9/1964 | Ploss | 23/300 |
| 3,682,601 | 8/1972 | Fedosoff | 23/300 |

FOREIGN PATENTS OR APPLICATIONS
| | | | |
|---|---|---|---|
| 663,618 | 5/1963 | Canada | 23/272 AM |

Primary Examiner—Norman Yudkoff
Assistant Examiner—S. J. Emery
Attorney, Agent, or Firm—Jack Axelrood

[57] ABSTRACT

A process for preparing from brine (an aqueous solution of salt) containing appreciable quantities of dissolved calcium sulfate either (1) high purity salt (sodium chloride) having the usual cubic crystalline form or (2) high purity dendritic salt, either form of salt being characterized by an exceptionally low calcium sulfate content. The process for the preparation of the cubic crystalline form of sodium chloride (hereinafter also referred to as "salt") is carried out by either (1) a "feed and bleed" procedure comprising admixing an alkali metal polyphosphate with said brine to increase the supersaturation of calcium sulfate therein, feeding the brine containing this additive into an evaporating and crystallizing chamber, evaporating the brine at an elevated temperature and reduced pressure to cause crystallization of pure salt and concomitantly bleeding brine from the chamber, the rate of feed of the brine to the chamber and the rate of bleed of brine from the chamber being such as to maintain the calcium sulfate in the dissolved state and prevent its precipitation with the salt, or by (2) subjecting brine to solar evaporation to concentrate same to the so-called "salt point", i.e., that point at which salt will crystallize from the brine if the brine is subjected to slightly more evaporation, adding to said salt-point brine an alkali metal polyphosphate to increase the supersaturation of calcium sulfate therein, feeding the brine containing the polyphosphate to a primary evaporating pond and subjecting the brine to solar evaporation to cause the continuous crystallization of salt therefrom and concomitantly bleeding brine from the primary evaporating pond to a secondary evaporating pond, the rate of feed of brine to the primary evaporating pond and the rate of bleed of brine therefrom being such as to maintain the calcium sulfate in the dissolved state in the primary evaporating pond and prevent its precipitation with the salt.

The process for the preparation of dendritic salt is the same feed and bleed process as utilized for the preparation of cubic crystalline salt, except that an alkali metal ferrocyanide is added to the brine in addition to an alkali metal polyphosphate.

5 Claims, 1 Drawing Figure

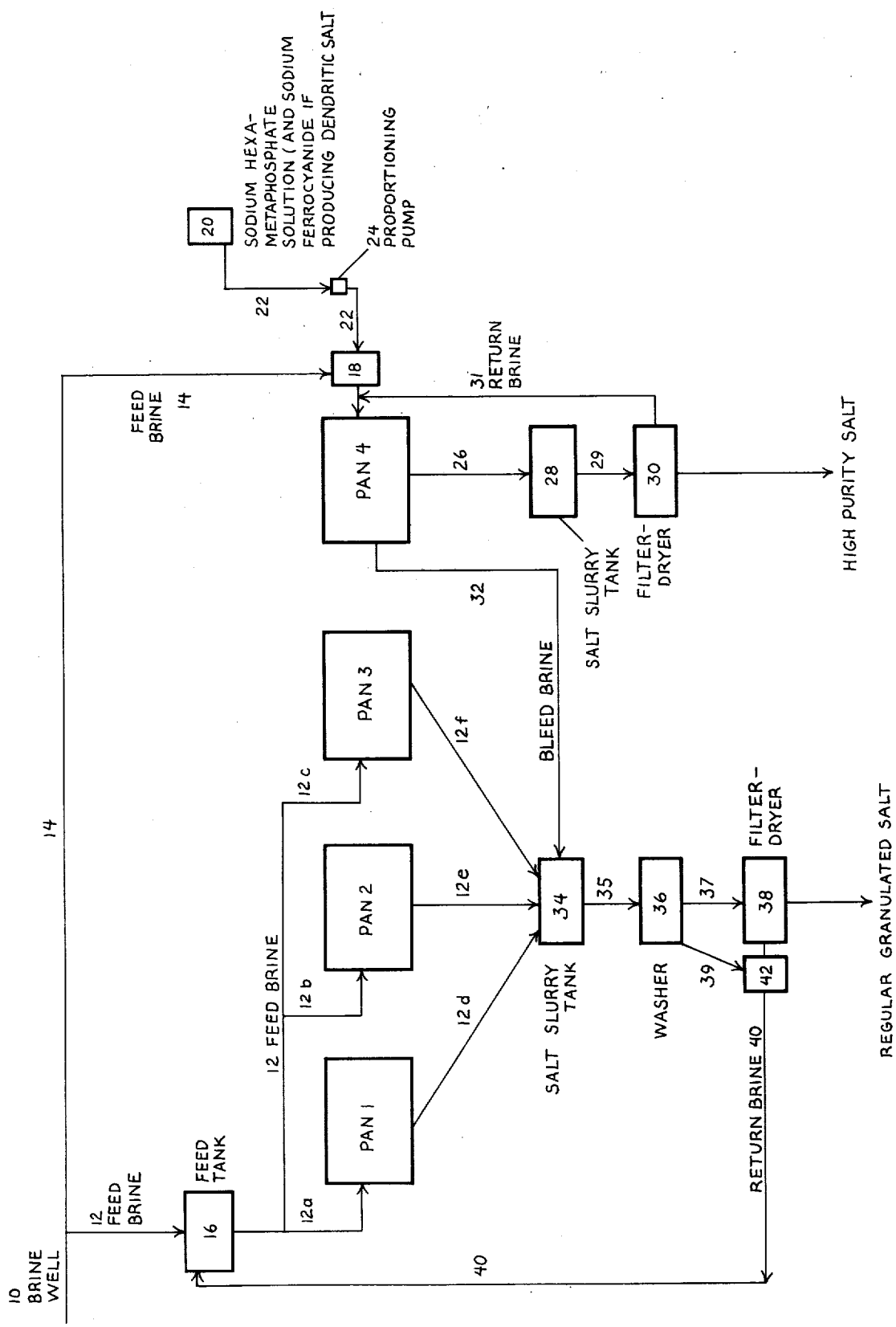

CRYSTALLIZATION OF SODIUM CHLORIDE OF REDUCED CALCIUM SULFATE CONTENT IN PRESENCE OF ABOUT 5 TO ABOUT 500 PPM

CROSS REFERENCE TO PRIOR APPLICATION

This is a continuation-in-part of application No. 439,289 filed Feb. 4, 1974, now abandoned.

BACKGROUND OF THE INVENTION

1. Field of the Invention

The field of this invention is the production of pure salt by the vacuum pan or solar evaporation of brine to cause crystallization of salt therefrom. In the conventional vacuum pan or evaporator methods operating with untreated brine for the production of salt, the salt so produced contains as much as 1500 parts per million of calcium sulfate, expressed as calcium. Such high calcium sulfate content presents serious problems to certain segments of the food industry, especially in the processing of certain vegetables, in pickling brines containing phosphates and in the preparation of salted butter. Some segments of the chemical industry which use salt in their operations are also adversely affected by the presence of excessive amounts of calcium sulfate.

In the conventional production of salt by the solar evaporation method as much as 1500 parts per million of calcium sulfate expressed as calcium is contained in the salt.

2. Description of Prior Art

It is known to the art to produce salt by the vaporation of brine in vacuum pans at elevated temperatures and reduced pressures to cause the crystallization of salt. The brine is usually provided from brine wells or by the dissolution of crude rock salt. In either case, the principal contaminant of the brine is calcium sulfate, which is usually present in the range of from about 0.5 to about 5.5 grams per liter. Other contaminants are calcium chloride, magnesium chloride or sulfate, and calcium bicarbonate. Further, it is customary to maintain solid calcium sulfate in the brine in the evaporators, approximately 20 to 200 grams per liter, for the purpose of preventing scaling of the evaporator heating tubes by the precipitation thereon of the calcium sulfate present in the brine, with the attendant loss of efficiency. As the brine is concentrated in the evaporator, and salt crystallizes therefrom, a portion of the calcium sulfate present also precipitates together with the salt as an internal inclusion within the salt crystals, and also as an external adherent. Thus the result is that it is not possible to remove this internal contaminant, nor is it possible to remove all of the external contaminant by simple washing.

It is also known to the art to prepare dendritic salt in a vacuum pan operation by the addition to brine of crystal-modifying agents including metal oxalates and ferrocyanides. The method in common use requires that the brine be treated to free it of its calcium and magneisum content, and also that the agitation of the brine in the evaporators be limited to insure production of the desired crystal form. The problems of preparing pure salt from brine and of reducing the calcium sulfate contamination thereof, and also the production of dendritic salt have been the subject of a number of patents.

Thus, U.S. Pat. No. 2,108,783 discloses the use of sodium hexametaphosphate as a sequestering agent for preventing the crystallization of calcium and magnesium during an ordinary brine evaporation process. The quantity of sodium hexametaphosphate necessary is at least about eight times the quantity of calcium present in the brine. Thus, for brine containing 2.5 to 5.5 grams per liter of calcium sulfate, it would be necessary to add 20 to 44 grams per liter of sodium hexametaphosphate.

U.S. Pat. No. 2,902,418 relates to incorporating into the dissolving water conducted to a salt deposite a combination of (1) a water soluble carbonate and (2) a molecularly dehydrated alkali metal phosphate having a defined $Na_2O$ to $P_2O_5$ ratio.

U.S. Pat. No. 2,906,559 relates to preparing sodium chloride brines of low calcium sulfate content by dissolving crude rock salt in water in the presence of a polyphosphate. The statement is made in this patent that "if I add the polyphosphate compounds of this invention to sodium chloride brine after it has been prepared by dissolving rock salt or other crude salt in water, there is virtually no effect whatever in reduction of the total amount of impurities present in the brine."

U.S. Pat. No. 2,906,600 relates to the use of a combination of a polyphosphoric acid compound and a compound containing alkaline earth metal ions as an additive to the water used to dissolved crude salt to prepare a brine low in calcium sulfate content.

U.S. Pat. No. 2,977,189 discloses that pure brine is produced by adding to sodium chloride containing calcium sulfate as an impurity, or to the water employed to dissolve said sodium chloride, or to both sodium chloride and the dissolving water a small amount of (1) an alkali metal carbonate and (2) an alkali metal phosphate selected from the group consisting of alkali metal pyrophosphates, hexametaphosphates, and tripolyphosphates.

U.S. Pat. No. 3,148,023 produces tetrakaidecahedra crystals of sodium chloride by dissolving in a substantially pure saturated aqueous sodium chloride solution a combination of sodium hexametaphosphate and a polyvalent metal ion (preferably aluminum).

U.S. Pat. No. 2,433,601 discloses the preparation of a brine low in calcium sulfate content from crude brine by dissolving the crude sodium chloride in water containing small amounts of sodium carbonate or trisodium phosphate. In this process, it is important that the pH of the water be at least about 7 so that an insoluble precipitate of calcium carbonate or calcium phosphate is formed which can be removed.

U.S. Pat. No. 3,205,013 teaches a process whereby an acidic compound supplying the phosphate ion ($PO_4^{\equiv}$) is injected at intervals into a stream of water used to dissolve crude rock salt and a base is also added to said water to provide a water pH of at least about 7.

U.S. Pat. No. 3,155,458 relates to the use of starch phosphate in a feed and bleed process for the production of sodium chloride having a low calcium sulfate content. The use of starch phosphate in the process is stated to be operable only on a substantially bicarbonate-free brine.

U.S. Pat. No. 2,642,335, relates to the production of dendritic salt, i.e., salt having a crystalline structure in the form of hollow cubes with corners having branched spikes thereon in three dimensions. This special form of salt is obtained by the addition to brine of a crystal-modifying substance including metal oxalates, metal ferrocyanides and metal ferricyanides, together with the evaporation of the brine under conditions of reduced agitation. To prepare a high purity dendritic salt by this method, i.e., one which contains less than about 100 parts per million of calcium sulfate expressed as calcium, requires the use of a "treated" brine. A treated brine is one from which essentially all of the calcium and most of the magnesium content are removed as precipitates by the addition of chemical agents such as soda ash ($Na_2CO_3$) and caustic soda (NaOH). If untreated brine is used in the preparation of dendritic salt by the method of U.S. Pat. No. 2,642,335, the resultant product contains the usual level of up to about 1500 parts per million of calcium sulfate expressed as calcium.

Thus, each of the foregoing prior art processes for the preparation of brine, or salt having a reduced calcium sulfate content offers certain disadvantages. For example: U.S. Pat. No. 2,108,783 requires the use of large quantities of sodium hexametaphosphate, i.e., about eight times the quantity of calcium sulfate present in the brine. U.S. Pat. No. 2,902,418 teaches the necessity of adding a combination of a carbonate and a particularly defined phosphate to the water used to dissolve salt from a salt deposit for the purpose of preventing the dissolution of calcium sulfate. This patent does not teach a method for maintaining calcium sulfate in solution in a brine in which it is already present, as for example, in brine from a brine well.

U.S. Pat. No. 2,906,599 teaches the use of a polyphosphate addition to the water used to dissolve crude rock salt to reduce the dissolution of calcium sulfate. Again, this fails to solve the problem of providing substantially calcium sulfate-free salt from an existing brine containing this impurity.

U.S. Pat. No. 2,906,600 is directed to the same concept as U.S. Pat. No. 2,906,599, i.e., reducing the dissolution of calcium sulfate while forming a brine from crude rock salt. U.S. Pat. No. 2,977,189 is similar in effect to U.S. Pat. No. 2,902,418 in that it too teaches a method of reducing the dissolution of calcium sulfate while forming a brine from crude salt. The principal difference appears to be that U.S. Pat. No. 2,977,189 employs a combination of carbonate and polyphosphate, whereas U.S. Pat. No. 2,902,418 uses a combination of carbonate and a specific molecularly dehydrated phosphate.

U.S. Pat. No. 3,148,023 addresses itself to the production of a particular crystalline form of sodium chloride and requires the addition of a combination of sodium hexametaphosphate and a compound of a polyvalent metal to pure saturated brine. Obviously, the process of this patent depends upon first providing a purified brine.

U.S. Pat. No. 2,433,601 teaches the removal of calcium sulfate from brine by precipitation of calcium as the carbonate or the phosphate. This process requires adjustment of the pH of the water where it is less than 7, and also requires the removal and disposal of precipitates.

U.S. Pat. No. 3,205,013 as do several of the other prior art patents, uses a combination of a phosphate (acidic) and an alkaline compound which is added to the water used to dissolve crude rock salt to prevent the concomitant dissolution of excessive quantities of calcium sulfate. Here again, pH adjustment to about 7 is necessary.

U.S. Pat. No. 3,155,458, which employs a starch phospate compound in a feed and bleed process, suffers from the following defects inherent in the use of starch phosphate:

1. Starch phosphate has a limited solubility in water (about 2%) thereby making it difficult to prepare aqueous solutions suitable for addition to brine.

2. Starch phosphate is subject to bacterial attack and therefore deteriorates upon standing.

3. Starch phosphate is operable only in bicarbonate-free brine.

U.S. Pat. No. 2,642,335 teaches a process for the production of dendritic salt which requires (1) the use of treated brine to provide salt having a calcium sulfate content less than about 100 parts per million calcium sulfate expressed as calcium, and also (2) reduced agitation of the brine in the evaporators to obtain the dendritic structure.

Accordingly, it would be desirable to provide (1) a vacuum pan evaporation process for preparing from crude brine containing appreciable quantities of calcium sulfate cubic crystalline salt or dendritic salt, each having a markedly reduced calcium sulfate content, and (2) a solar evaporation process for preparing from crude brine containing appreciable quantities of calcium sulfate cubic crystalline salt having a markedly reduced calcium sulfate content. It would be desirable to provide the foregoing without the necessity of employing combinations of phosphates and alkaline compounds, or without the necessity of pH adjustment, or without the necessity of precipitation and precipitate-removing procedures, or without the necessity of maintaining solid calcium sulfate in the brine in the vacuum pans, or without the necessity of avoiding vigorous agitation of brine, or without employing substances which have limited solubility in water, or limited stability, or are otherwise limited with respect to the type of brine in which they function.

It is therefore an object of this invention to provide a vacuum pan process for producing either cubic crystalline salt or dendritic salt, each having a very low calcium sulfate content, which process can utilize raw or crude brine.

It is also an object of this invention to provide a solar evaporation process for producing cubic crystalline salt having a very low calcium sulfate content.

It is another object of this invention to provide a vacuum pan process for the production of pure cubic crystalline salt and dendritic salt having a very low calcium sulfate content which does not require the maintenance of solid calcium sulfate in the brine in the crystallizing chambers.

It is a further object of this invention to provide a vacuum pan process for the production of pure cubic crystalline salt and dendritic salt having a very low calcium sulfate content which does not require the use of large quantities of any extraneous compound or combinations of compounds.

It is a still further object of this invention to provide a process for the production of pure cubic crystalline salt and dendritic salt having a very low calcium sulfate content in a salt crystallizing operation which process obviates the formation of calcium precipitates and the necessity of removing same.

It is another object of this invention to provide a vacuum pan process for the production of pure cubic crystalline salt and dendritic salt having a very low calcium sulfate content from crude brine containing calcium sulfate as an impurity which process does not require pH adjustment of the brine or the removal of bicarbonate therefrom.

It is yet another object of this invention to provide a vacuum pan evaporation process for the production of pure cubic crystalline salt and dendritic salt having a very low calcium sulfate content which process does not cause scaling of the heating surfaces of the evaporator unit.

Broadly, one aspect of the present invention comprises a process for preparing a high purity cubic crystalline sodium chloride having a reduced calcium sulfate content which comprises continuously feeding raw sodium chloride brine containing dissolved calcium sulfate into an evaporating and crystallizing chamber, concentrating and evaporating said brine at an elevated temperature and at a reduced pressure in the presence of at least about 5 parts per million on a saturated brine basis of an alkali metal polyphosphate to produce a crystalline sodium chloride, concomitantly bleeding brine from said evaporating chamber, the rate of feed of raw brine to said evaporating chamber and the rate of feed of raw brine to said evaporating chamber and the rate of bleed of brine therefrom being adjusted to maintain calcium sulfate in solution, and concomitantly withdrawing solid sodium chloride crystals from said evaporating chamber.

Another aspect of this invention comprises a process for preparing dendritic salt of high purity and exceptionally low calcium sulfate content which comprises continuously feeding raw sodium chloride brine containing dissolved calcium sulfate into an evaporating and crystallizing chamber, concentrating and evaporating said brine at an elevated temperature and at a reduced pressure in the presence of at least about 5 parts per million on a saturated brine basis of an alkali metal polyphosphate, adding to said brine an alkali metal ferrocyanide at a rate sufficient to produce a crystalline dendritic salt having a bulk density not exceeding about 59 pounds per cubic foot and containing less than about 13 parts per million of said alkali metal ferrocyanide, concomitantly bleeding brine from said evaporating chamber, the rate of feed of raw brine to said evaporating chamber and the rate of bleed of brine therefrom being adjusted to maintain calcium sulfate in solution, and concomitantly withdrawing solid sodium chloride crystals from said evaporating chamber.

The pure cubic crystalline salt or dendritic salt crystallized by the present feed and bleed vacuum pan process may be filtered, washed and dried by any convenient means.

A further aspect of the present invention comprises subjecting brine to solar evaporation to concentrate same to the salt point, adding to said salt point brine at least about 5 parts per million on a saturated brine basis of an alkali metal polyphosphate to increase the supersaturation of calcium sulfate therein, feeding said salt point brine containing said polyphosphate to a primary evaporating pond and subjecting said brine therein to solar evaporation to cause the continuous crystallization of cubic crystalline salt therefrom and concomitantly bleeding brine from the primary evaporating pond to a secondary evaporating pond, the rate of feed of salt point brine containing polyphosphate to the primary evaporating pond and the rate of bleed of brine therefrom to said secondary pond being such as to maintain the calcium sulfate present in the brine in the primary evaporating pond in the dissolved state and thereby prevent its precipitation with the salt in said primary pond. The pure crystallized salt deposited in the primary pond is harvested in the usual manner.

As compared with the standard vacuum pan method of producing high purity salt which requires pretreatment of the brine to chemically remove impurities (calcium and magnesium salts) followed by separation of brine from the precipitated solids, the present feed and bleed process utilizing raw brine provides substantial savings in cost of chemicals, labor, and equipment.

The terms "very low calcium sulfate content" and "reduced calcium sulfate content" are here taken to mean a calcium sulfate content ranging as low as about 25 parts per million and up to about 100 parts per million, expressed as Ca.

Calcium sulfate is generally inversely soluble in brine with increasing temperature. This accounts for its precipitation together with sodium chloride in evaporators (vacuum pans) which are maintained at elevated temperatures. As previously stated, there have been many methods provided by the prior art to either remove calcium sulfate from brine prior to the entry of the brine into an evaporating chamber, or to inhibit its dissolution in the water used to dissolve salt to make brine. Surprisingly, it was found that an alkali metal polyphosphate, when present in very small quantities, has the unexpected property of greatly increasing the supersaturation of calcium sulfate in saturated brine. This unusual phenomenon makes it possible to add an alkali metal polyphosphate directly to raw brine and evaporate and crystallize salt therefrom in a solar evaporation process or at elevated temperatures in a vacuum pan operation before the solubility of calcium sulfate is exceeded and coprecipitates with the salt. As the evaporation process continues and the concentration of calcium sulfate in the brine increases, the calcium sulfate-enriched brine is bled from the evaporator or from the solar evaporating pond before calcium sulfate can precipitate. Concomitantly with the bleeding of the calcium sulfate-enriched brine from the evaporator or the pond, fresh brine to which an alkali metal polyphosphate has been added is fed into the evaporator or the pond to maintain the continuity of the process.

The term "alkali metal polyphosphate" is here taken to include sodium hexametaphosphate, potassium hexametaphosphate, sodium tripolyphosphate, potassium tripolyphosphate, tetrasodium pyrophosphate, and tetrapotassium pyrophosphate. The preferred alkali metal polyphosphate is sodium hexametaphosphate (hereinafter "SHMP"), and reference will be had to this compound in the present specification as illustrative of an alkali metal polyphosphate. The unique function of the alkali metal polyphosphates in the present invention is illustrated by the fact that orthophosphates are not effective to increase the supersaturation of calcium sulfate in saturated brine, as is demonstrated hereinafter by Example 2.

It has been found that for brine at a temperature of about 125°F. and containing about 5 grams per liter of calcium sulfate, the addition of as little as 5 parts per million of SHMP on a saturated brine basis (0.0005%) is sufficient to increase the apparent solubility of calcium sulfate to 9.3 grams per liter, a solubility increase of 1.8 times. Increasing the SHMP concentration to 100 parts per million at this temperature increases the apparent solubility of calcium sulfate to about 10.5 grams per liter, or a concentration increase (or concentration factor) approximately 2.1 times the original concentration. As is illustrated by the examples, a concentration factor as high as 2.5 is attained by coordinating the parameters of brine temperature and SHMP concentration in the initial and feed brines. It was, of course, totally unexpected that so minute a quantity of SHMP would have so great an effect on the apparent solubility of calcium sulfate. The concentration of SHMP may range from about 5 to about 500 parts per million, and preferably from about 5 to about 100 parts per million on a saturated brine basis. Inasmuch as the concentration of sodium chloride in saturated brine is about 25 percent to about 26 percent, on a salt basis the concentration of SHMP would range from about 20 to about 2000 parts per million.

The dendritic salt produced by the present feed and bleed process utilizing both an alkali metal polyphosphate and an alkali metal ferrocyanide produces salt having a hollow cubical structure with three-dimensional branched spikes on the corners thereof. This special form of salt prevents close packing and results in a bulk density that is much lower than that of conventional salt having a cubic crystalline form. For example, the dendritic salt prepared by the process of this invention has a bulk density ranging from about 53 to about 59 pounds per cubic foot, or from about 0.85 gm./cc. to about 0.93 gm./cc. By way of contrast, the bulk density of cubic crystalline salt is in the range of about 72 pounds per cubic foot. Advantages inherent in dendritic salt over cubic crystalline are superior non-caking characteristics and a faster rate of dissolution in water and superior blending properties.

Although any of the alkali metal ferrocyanides are operable in this process, sodium ferrocyanide is preferred. The rate of addition of alkali metal ferrocyanide is adjusted during operation of the present feed and bleed process to achieve maximum salt crystal modification to the dendritic form and to obtain dendritic salt having an alkali metal ferrocyanide content less than about 13 parts per million. The Federal Food and Drug Administration permits up to 13 parts per million of sodium ferrocyanide in salt for human consumption.

The present process may be carried out in either a single evaporator or in a multiple effect evaporator system. The terms "evaporator", "evaporating and crystallizing chamber", and "vacuum pan" or "pan" are used interchangeably herein. In a four-pan multiple effect vacuum pan system, for example, the first vacuum pan generally is operated under conditions of the highest temperature and pressure. The second pan has the second highest temperature and pressure, the third pan has the third highest temperature and pressure and the fourth pan has the lowest temperature and pressure. The cooler fourth and third pans are usually selected for carrying out the present feed and bleed process, although it should be understood that the process is not limited to these pans and can be carried out in the hotter pans. The temperatures generally employed in multiple effect evaporators vary from a high of about 260°F. in a forced-circulation pan and about 225°F. in a Calandria pan to a low of about 90° to 100°F. in a Calandria pan and about 125°F. in a forced-circulation type evaporator.

It should be understood that the above temperatures and pressures are typical for a quadruple effect system. It is possible to use additional pans in which case the temperatures and pressures would vary somewhat from the aforementioned values.

In the conventional type vacuum pan system, the deposition of calcium sulfate gradually builds up during the course of operation and accumulates on the heating surfaces thereby diminishing the efficiency of operation and necessitating periodic cleaning. It is customary to add solid calcium sulfate to the brine in the vacuum pans to prevent its deposition with the aforementioned disadvantages. By the practice of the present feed and bleed process in the presence of small quantities of SHMP, it is not necessary to add solid calcium sulfate as the entire problem of calcium sulfate deposition is obviated. Further, the present process is operable in the presence of calcium bicarbonate which is a contaminant usually encountered in raw brine. The removal of bicarbonate is required for the successful operation of certain salt crystallizing processes, particularly that of U.S. Pat. No. 3,155,453 previously discussed.

In one preferred embodiment of the present invention relating to a vacuum pan operation, the rate of feed of fresh brine to the evaporator and bleed of calcium sulfate-enriched brine therefrom is concatenated such that calcium sulfate is maintained in solution and not permitted to precipitate or crystallize together with sodium chloride. Inasmuch as the concentration in saturated brine of calcium sulfate is increased by a factor of about 2 by the addition of SHMP, calcium sulfate-enriched brine must be bled from the vacuum pan prior to the time when the concentration of calcium sulfate reaches this level. Consequently, periodic analyses are made of the calcium sulfate content of the brine in the evaporator so that the calcium sulfate-enriched brine is bled when the level of calcium sulfate reaches a concentration factor of about 1.8 times to provide a reasonable margin of safety. On an operational basis, it has been found that from about 40 to about 70 percent of the feed brine is bled from the evaporator.

For the preparation of pure cubic crystalline salt by the present invention using solar evaporation of brine, periodic analyses are made of the calcium sulfate content of the brine in the primary evaporating pan so that the calcium sulfate-enriched brine is bled from the primary evaporator when the level of calcium sulfate reaches a concentration factor of about 1.5 times to provide a reasonable margin of safety against its precipitation with the salt. Calcium sulfate-enriches brine from the primary evaporating pond is bled to a secondary crystallizing pond where evaporation is permitted to continue to the normal bittern point, i.e., that point at which magnesium sulfate begins to precipitate. As is readily apparent, salt crystallized in the secondary pond contains a greater calcium content than that crystallized in the primary pond.

For a clearer understanding of the vacuum pan process of the present invention, reference is now made to the drawing illustrating the present feed and bleed process.

The drawing is a flow diagram depicting a four-pan salt production process employing the present feed and bleed procedure. It is seen that there are four vacuum pans or evaporators identified as Pan 1, Pan 2, Pan 3, and Pan 4, respectively. Pan 4, is here referred to as the feed and bleed evaporator, and Pans 1, 2, and 3 as "conventional evaporators". Raw brine ("feed brine") from brine well 10 is conducted via line 12 to feed tank 16 from which it is distributed to Pans 1, 2, and 3 via lines 12a, 12b, and 12c, respectively. Feed brine is also conducted through line 14 to mixing point 18. An aqueous solution of sodium hexametaphosphate, and of sodium ferrocyanide if dendritic salt is being produced, is contained in tank 20, and is injected through line 22 into said feed brine at mixing point 18 by means of proportioning pump 24. The rate of sodium hexametaphosphate addition is such as to provide a concentration on a saturated brine basis of from about 5 to 500 parts per million. The rate of sodium ferrocyanide addition, if used, is adjusted to provide dendritic salt containing no more than 13 parts per million of sodium ferrocyanide. The raw brine, now containing sodium hexametaphosphate (and sodium ferrocyanide, if used), continues through line 22 to Pan 4. The temperature in this feed and bleed evaporator is maintained at about 130°F. if it is a forced circulation type, or from about 100° to about 120°F. if it is a so-called "Calandria" type, under reduced pressures ranging from a low of about 1.5 for a Calandria pan to a high of about 3.5 inches of mercury (absolute) for a forced circulation type.

As water is evaporated from Pan 4, the concentration of salt exceeds its solubility in the brine and pure salt crystallizes therefrom to form a salt slurry. This slurry is drained periodically (or continuously, if desired) via line 26 into salt slurry tank 28. The slurry is then conducted via line 29 to a suitable filter-dryer 30 where the solid salt is separated from the slurry by conventional filtration means, washed with water and then dried to provide a pure sodium chloride having no more than about 25 to 100 parts per million of calcium and magnesium content expressed as calcium.

The concentration of calcium sulfate in solution in Pan 4 increases and builds up as water is evaporated and as salt is crystallized. It is important ot the successful operation of the present process and to the production of pure salt that the calcium sulfate be maintained in the dissolved state and not be permitted to precipitate in Pan 4 and thereby contaminate the salt. As previously mentioned, sodium hexametaphosphate has the unexpected effect of increasing the supersaturation of calcium sulfate in brine, thereby permitting more water to be evaporated from the brine before calcium sulfate begins to precipitate. To determine that point at which calcium sulfate will precipitate requires periodic monitoring (analyses) of the brine in this pan to insure that the concentration of calcium sulfate does not exceed about 1.8 to 2.0 times its concentration in the original raw brine. When its concentration approaches a concentration factor of about 1.8, the calcium sulfate-enriched brine is bled from Pand 4 via line 32 to salt slurry tank 34 where it is commingled with salt slurry from Pans 1, 2, and 3. If desired, this bleed brine may also be fed directly to Pans 1, 2, or 3. When the brine is so bled, fresh feed brine admixed with SHMP is introduced into Pan 4 as before. The rate of brine bleeding from pan 4 and the rate of feed of fresh brine containing SHMP into Pan 4 are concatenated so that the quantity of calcium sulfate dissolved in the brine is always maintained at a concentration below its precipitation point.

Pans 1, 2, and 3 are operated in the conventional manner. That is, they are arranged in a cascade manner with respect to the heat source. Thus, steam for heating purposes is fed to a steam jacket surrounding Pan 1. Vapor from Pan 1 is passed to a steam jacket surrounding Pan 2, vapor from Pan 2 is passed to a stream jacket surrounding Pan 3, and vapor from Pan 3 is passed to the steam jacket surrounding Pan 4. If the evaporating pans are of the forced circulation type, then operating conditions therein may be in the temperature range of from about 250°-260°F. at a pressure of 38 to 53 inches of mercury (absolute) in Pan 1, from about 200° to 220°F. at a pressure of 17.5 to 26 inches of mercury (absolute) in Pan 2, and from about 170° to about 190°F. at a pressure of 9 to 14 inches of mercury (absolute) in Pan 3. If the evaporating pans are of the Calandria type, the operating conditions therein may be in the temperature range of from about 200° to about 220°F. at a pressure of 17.5 to 26 inches of mercury (absolute) for Pan 1, from about 175° to about 190°F. at a pressure of 10 to 14 inches of mercury (absolute) in Pan 2, and from about 140° to about 160°F. at a pressure of 4.5 to 7.0 inches of mercy (absolute) in Pan 3.

Salt slurry from Pans 1, 2, and 3 is withdrawn through lines 12d, 12e, and 12f, respectively, into salt slurry tank 34, from which tank the slurry is conducted to washer 36 via line 35. The salt slurry receives a countercurrent brine wash and the washed slurry is then passed through line 37 to filter-dryer 38 where the slat is separated by filtration and dried to provide the final conventional granulated salt product. The brine from filter 38 is recycled to feed tank 16 through line 40. Excess brine from washer 36 may be recycled to feed tank 16 via line 39 which joins line 40 at juncture 42.

Regular cubic crystalline salt produced by the conventional vacuum pan technique contains from about 600 to 1500 parts per million pf calcium sulfate, expressed as calcium. If it were possible to make dendritic salt from raw, untreated brine by a conventional vaccum process, the salt would contain up to 1500 parts per million of calcium sulfate expressed as calcium. This is to be contrasted with cubic crystalline salt or dendritic salt produced by the present feed and bleed process utilizing raw brine in which the concentration of calcium sulfate ranges from about 25 to about 100 parts per million, expressed as calcium.

It should be noted that the present feed and bleed process provides for the retention in solution of calcium sulfate and the prevention of its precipitation with the salt. By way of contrast, as previously mentioned, in the conventional method for the production of salt by the aforedescribed vacuum pan process it is common practice to maintain a suspension of solid calcium sulfate in the pans to prevent scaling of the heating surfaces by calcium sulfate which continually precipitates during the evaporation process and contaminates the salt.

Although the present feed and bleed process can be carried out with any type of brine, even that containing considerable quantities of calcium bicarbonate, a bicarbonate removal step may be incorporated in the system, if desired. This is done by conducting feed brine to a separate tank where it is treated with sodium hydroxide to precipitate calcium carbonate therefrom. The bicarbonate-free brine is then admixed with SHMP prior to entry into Pan 4, and the feed and bleed process is carried out as described.

For a more complete understanding of the present invention, reference is now made to the following specific examples which illustrate the high purity salt obtained by this feed and bleed process.

DESCRIPTION OF THE PREFERRED EMBODIMENTS

Example 1

The effect of various quantities of SHMP on the solubility of calcium sulfate in saturated brine was determined in the following manner:

A saturated brine, maintained at a temperature of 125°F. was also saturated with respect to calcium sulfate by dissolving therein 5.5 grams of calcium sulfate per liter. To one portion of this brine there was added 5 parts per million of SHMP. This brine was then placed in a vessel under vacuum and constant agitation to evaporate water therefrom and thereby increase the concentration of calcium sulfate therein. Periodically, the calcium content was determined until the point was reached where calcium sulfate precipitation occurred. This procedure was repeated with 12.5, 50, and 100 parts per million of SHMP respectively.

The results were as follows:

| SHMP Concentration | G.P.L.[1]CaSO$_4$ | Concentration Factor[2] |
|---|---|---|
| (PPM) | (Maximum) | |
| 0 | 5.5 | |
| 5 | 9.3 | 1.69 |
| 12.5 | 10.2 | 1.86 |
| 50 | 10.1 | 1.84 |
| 100 | 10.5 | 1.91 |

[1]Grams Per Liter

[2] $\dfrac{G.P.L. \; CaSO_4}{5.5}$

Example 2

The procedure of Example 1 was repeated except that 30 parts per million of trisodium phosphate (an orthophosphate) was substituted for SHMP. The concentration at which calcium sulfate precipitation occurred was 5.5 grams per liter, or the same as that with no additive present. This demonstrates that an orthophosphate has no effect in increasing the supersaturation of calcium sulfate in saturated brine.

Example 3

Salt was produced by the process of this invention in a feed and bleed evaporator operated as part of a quadruple effect set (Pans 1, 2, 3 and 4) of forced-circulation vacuum pans. The feed and bleed evaporator was Pan 4, to which there was added clear raw brine from a brine well. Analysis showed that this brine contained 3.4 grams of calcium sulfate per liter, which is the saturation level for calcium sulfate in this particular brine which also contains 5.1 grams of calcium chloride per liter. Just prior to the entry of this brine into Pan 4, an aqueous solution of SHMP containing 0.335 pounds of SHMP per gallon was added at a rate to provide a SHMP concentration in the brine of 25 parts per million on a saturated brine basis.

The temperature in Pan 4 was maintained at a range of from about 125° to about 135°F. and at a reduced pressure of about 3.5 inches of mercury (absolute). Pans 1, 2, and 3 were operated in the conventional manner in which calcium sulfate was maintained in suspension and in which the following temperatures and pressure conditions were maintained:

| | Temperature | Pressure - Inches of Mercury (Absolute) |
|---|---|---|
| Pan 1 | 247°F. | 42.3 |
| Pan 2 | 208°F. | 20.3 |
| Pan 3 | 172°F. | 9.4 |

When the concentration of calcium (as Ca) in the brine contained in Pan 4 reached about 6 grams per liter, i.e., a concentration factor of about 1.8, the brine was bled to a salt slurry tank which also receives salt slurry from Pans 1, 2 and 3. As salt crystallized in Pan 4 to form a brine slurry, the slurry was collected, dewatered by filtration, washed with water to remove external soluble impurities and then dried. Analysis of the dried salt showed a sodium chloride content of 99.99 percent with only 30 parts per million of calcium and magnesium combined, expressed as calcium.

Example 4

The following experiment was conducted to evaluate the operability of alkali metal polyphosphates in increasing the supersaturation of calcium sulfate in saturated brine:

To a sample of saturated brine containing 5.2 grams per liter of calcium sulfate and maintained at a temperature of 134°F. and reduced pressure there was added 30 parts per million of SHMP. As evaporation proceeded, feed brine containing 20 parts per million of SHMP was added to maintain constant volume. Samples of filtered brine were removed periodically and analyzed for calcium content. Evaporation was continued until the maximum calcium sulfate solubility was reached and the level of calcium sulfate in the brine started to decrease. In this way, the maximum level of calcium sulfate solubility was determined. The results were as follows:

| Additive | Initial Brine (ppm) | Feed Brine (ppm) | Temp. °F. | Maximum G.P.L. CaSO$_4$ Reached in Brine | Conc. Factor |
|---|---|---|---|---|---|
| None - Blank | | | 134 | 5.2 | |
| SHMP | 30 | 20 | 134 | 11.40 | 2.19 |

Example 5–13

The procedure of Example 4 was repeated except that the additives, concentrations thereof in the initial and feed brines, and the temperatures were varied as indicated in the following tabulation with the results as set forth therein:

| Example | Additive | Initial Brine (ppm) | Feed Brine (ppm) | Temp. °F. | Maximum G.P.L. CaSO$_4$ Reached In Brine | Conc.* Factor |
|---|---|---|---|---|---|---|
|  | None-Blank |  |  | 134 | 5.2 |  |
| 5 | SHMP | 30 | 20 | 155 | 9.64 | 1.85 |
| 6 | SHMP | 30 | 20 | 175 | 8.04 | 1.55 |
| 7 | SHMP | 60 | 40 | 134 | 13.05 | 2.50 |
| 8 | SHMP | 60 | 40 | 155 | 11.20 | 2.16 |
| 9 | SHMP | 60 | 40 | 175 | 10.00 | 1.92 |
| 10 | Sodium Tripoly-phosphate | 30 | 20 | 134 | 9.25 | 1.78 |
| 11 | " | 30 | 20 | 155 | 8.30 | 1.60 |
| 12 | " | 30 | 20 | 175 | 7.90 | 1.52 |
| 13 | Tetra-sodium Pyro-phosphate | 20 | 15 | 134 | 7.73 | 1.49 |

*Concentration Factor = $\dfrac{\text{Maximum G.P.L. CaSO}_4\text{ Reached}}{5.2}$

Example 14

The procedure of Example 3 was repeated except that dendritic salt was produced in a triple effect Calandria set of vacuum pans. In addition to the aqueous solution of SHMP added to the No. 3 Pan, a 10 percent solution of sodium ferrocyanide was added at a rate which was adjusted to produce proper crystal modification (dendritic salt). The dendritic salt so produced had a bulk density of 55 lbs/ft.$^3$ (pounds per cubic foot) and a sodium ferrocyanide content of 12 parts per million. Continued operation produced dendritic salt having a bulk density varying from 53–59 lbs./ft.$^3$ and less than 13 parts per million of sodium ferrocyanide.

The following temperature and pressure conditions were maintained.

|  | Temp. °F. | Pressure-Inches of Mercury Absolute |
|---|---|---|
| Pan 1 | 210 | 21 |
| Pan 2 | 170 | 9 |
| Pan 3 | 120 | 2.5 |

What is claimed is:

1. A process for preparing a high purity cubic crystalline sodium chloride having a reduced calcium sulfate content which comprises continuously feeding raw sodium chloride brine containing dissolved calcium sulfate in an amount of from about 0.5 to about 5.5 grams per liter into an evaporating and crystallizing chamber, concentrating and evaporating said brine at an elevated temperature below about 260°F. and at reduced pressure in the presence of no more than from about 5 to about 500 parts per million on a saturated brine basis of an additive consisting of an alkali metal polyphosphate to produce a crystalline sodium chloride, concomitantly bleeding brine from said evaporating chamber at a rate such that the maximum calcium sulfate content the brine reaches is from about one and one half to about twice that of its concentration in the raw brine, the rate of feed of raw brine to said evaporating chamber and the rate of bleed of brine therefrom being adjusted to maintain calcium sulfate in solution, and concomitantly withdrawing solid sodium chloride crystals from said evaporating chamber, said sodium chloride containing not more than about 30 ppm of calcium expressed as calcium.

2. The process of claim 1 wherein the alkali metal polyphosphate is sodium hexametaphospate and is present in an amount of from about 5 to about 100 ppm.

3. A process for preparing a high purity cubic crystalline sodium chloride having a reduced calcium sulfate content which comprises continuously feeding a sodium chloride brine containing dissolved calcium sulfate in an amount of from about 0.5 to about 5.5 grams per liter into an evaporating and crystallizing chamber, evaporating and concentrating said brine at a temperature below about 220°F. and at a reduced pressure and in the pressure of no more than from about 5 to about 500 parts per million on a saturated brine basis of an additive consisting of an alkali metal polyphosphate to produce crystalline sodium chloride, concomitantly bleeding brine from said evaporating chamber at a rate equal to from 40 percent to 70 percent of the brine feed rate, and concomitantly continuously withdrawing solid sodium chloride from said evaporating chamber, said sodium chloride containing not more than about 30 ppm of calcium expressed as calcium.

4. The process of claim 3 wherein the alkali metal polyphosphate is sodium hexametaphosphate and is present in a concentration of from 5 to 100 parts per million on a saturated brine basis.

5. A process for preparing a high purity cubic crystalline sodium chloride having a reduced calcium sulfate content which comprises continuously feeding a sodium chloride brine containing dissolved calcium sulfate in an amount of from about 0.5 to about 5.5 grams per liter into an evaporating and crystallizing chamber, concentrating said brine at a temperature below 165°F. at reduced pressure and in the presence of no more than from about 5 to 100 parts per million on a saturated brine basis of additive consisting of an sodium hexametaphosphate to produce a crystalline sodium chloride, concomitantly bleeding brine from said evaporating chamber in an amount of from 45 percent to 70 percent of the brine feed, concomitantly withdrawing solid sodium chloride from said evaporating chamber as a slurry in saturated brine, filtering and washing said sodium chloride with brine and water, and recovering and drying the sodium chloride from said process, said sodium chloride containing not more than about 30 ppm of calcium expressed as calcium.

* * * * *